（12） United States Patent
Beaucourt et al.

(10) Patent No.: US 10,879,596 B2
(45) Date of Patent: Dec. 29, 2020

(54) ANTENNA FOR WEARABLE DEVICES METHODS, APPARATUSES, AND SYSTEMS

(71) Applicant: INTEL CORPORATION, Santa Clara, CA (US)

(72) Inventors: Paul Beaucourt, Santa Clara, CA (US); Aycan Erentok, Santa Clara, CA (US); Jose Rodrigo Camacho Perez, Guadalajara Jalisco (MX); John Groff, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 15/421,359

(22) Filed: Jan. 31, 2017

(65) Prior Publication Data

US 2018/0219279 A1 Aug. 2, 2018

(51) Int. Cl.
*H01Q 1/27* (2006.01)
*H01Q 1/24* (2006.01)
*H01Q 1/38* (2006.01)
*H01Q 7/00* (2006.01)
*H04B 5/00* (2006.01)
*H04W 88/06* (2009.01)

(52) U.S. Cl.
CPC ............. *H01Q 1/273* (2013.01); *H01Q 1/243* (2013.01); *H01Q 1/38* (2013.01); *H01Q 7/00* (2013.01); *H04B 5/00* (2013.01); *H04B 5/0031* (2013.01); *H04W 88/06* (2013.01)

(58) Field of Classification Search
CPC .......... H01Q 1/273; H01Q 1/24; H01Q 1/48; H01Q 1/38; H01Q 7/00; H04W 88/06; H04B 5/00; H04B 5/0031
See application file for complete search history.

(56) References Cited

U.S. PATENT DOCUMENTS 7,215,600 B1 *  5/2007  DeRosa ................. G04G 21/04
                                                         343/718
9,024,826 B2    5/2015  Tolbert et al.
                        (Continued)

FOREIGN PATENT DOCUMENTS

KR   10-2016-0026581 A    3/2016
WO      2014065896 A1     5/2014
WO      2015117647 A1     8/2015

OTHER PUBLICATIONS

International Search Report and Written Opinion dated Apr. 30, 2018 for International Application No. PCT/US2018/015097, 14 pages.

*Primary Examiner* — Dimary S Lopez Cruz
*Assistant Examiner* — Bamidele A Jegede
(74) *Attorney, Agent, or Firm* — Schwabe, Williamson & Wyatt, P.C.

(57) ABSTRACT

Embodiments include apparatuses, methods, and systems for an antenna for a wearable device that includes a bezel on the wearable device to include a conductive circuit path to transmit and receive radiofrequency (RF) signals to and from the wearable device. In some embodiments, the bezel may be formed of a substantially conductive material to form the conductive circuit path. In other embodiments the bezel may be formed of a substantially non-conductive material and may include a conductive antenna pattern located on a surface of the bezel to form the conductive circuit path. Other embodiments may also be described and claimed.

12 Claims, 7 Drawing Sheets

Top Perspective View

Semi-Exploded View

(56) References Cited

U.S. PATENT DOCUMENTS

| | | |
|---|---|---|
| 9,225,388 B2 | 12/2015 | Konanur et al. |
| 2004/0155818 A1* | 8/2004 | Barras .................. G04G 21/04 343/700 MS |
| 2007/0109208 A1 | 5/2007 | Turner |
| 2008/0316115 A1* | 12/2008 | Hill ...................... H01Q 1/243 343/702 |
| 2011/0133995 A1* | 6/2011 | Pascolini ................ H01Q 7/00 343/702 |
| 2013/0135157 A1* | 5/2013 | Tsou .................. H01Q 1/2266 343/702 |
| 2013/0194139 A1* | 8/2013 | Nickel .................. H01Q 5/328 343/703 |
| 2014/0225786 A1* | 8/2014 | Lyons .................. G04G 21/04 343/702 |
| 2014/0253393 A1* | 9/2014 | Nissinen ................ H01Q 1/36 343/702 |
| 2014/0266920 A1* | 9/2014 | Tran ........................ H01Q 7/00 343/702 |
| 2014/0354494 A1* | 12/2014 | Katz ....................... H01Q 9/42 343/718 |
| 2015/0048979 A1* | 2/2015 | Asrani .................. H01Q 1/521 343/702 |
| 2015/0349410 A1* | 12/2015 | Russell ................ H01Q 1/273 343/702 |
| 2016/0099497 A1* | 4/2016 | Lee ......................... H01Q 1/38 343/702 |
| 2016/0142866 A1 | 5/2016 | Jang et al. |
| 2016/0254587 A1 | 9/2016 | Jung et al. |
| 2016/0261032 A1* | 9/2016 | Chang .................. G04R 60/12 |
| 2017/0062912 A1* | 3/2017 | Shewan ................ H01Q 13/10 |
| 2017/0133752 A1* | 5/2017 | Choi ..................... G04R 60/02 |
| 2017/0373381 A1* | 12/2017 | Robinson ............... H01Q 1/243 |

* cited by examiner

ANTENNA FOR WEARABLE DEVICES METHODS, APPARATUSES, AND SYSTEMS

FIELD

Embodiments of the present invention relate generally to the technical field of wireless communication, and more particularly to antenna for wearable devices methods, apparatuses, and systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Present-day wearable devices have numerous capabilities, such as, e.g., initiation and completion of consumer payment, an important user experience for wrist worn connected devices. Consumer payment and other functions requiring radiofrequency (RF) connection may be enabled using the near-field communications (NFC) system. NFC is a high-frequency wireless communications technology that enables the exchange of data between two compatible devices within short distances. The NFC system and similar communications technologies utilize highly resonant antenna coils to create sufficient H-fields to support certain Q values that enable low data rates for short distances. Many consumer electronic devices, however, use conductive materials, e.g., stainless steel to differentiate an industrial design aspect of a given wearable product. Unfortunately, utilization of conductive materials can introduce a major challenge in antenna integration for such devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a wearable device, mobile device such as a smartphone (which may include one or more processors), a tablet, a laptop computer, a set-top box, a gaming console, and so forth.

As noted above, payment and other functions requiring an RF connection may be enabled using the near-field communications NFC system. Utilization of conductive materials in devices, e.g., consumer electronic devices, however, can introduce a major challenge in NFC antenna integration. Conductive materials may reduce Q values due to out-of-phase eddy currents induced by the currents on an antenna coil. In addition, oftentimes, antennas may be often located under a display module and/or touch panel. The losses associated with the display module and conductive layers may reduce Q values, thus degrading a viable communication distance. Accordingly, as described in some embodiments below, a bezel of a wearable device may include an antenna that may be located above a user interface, thereby reducing challenges associated with utilization of conductive materials in wearable devices.

Figure 1:
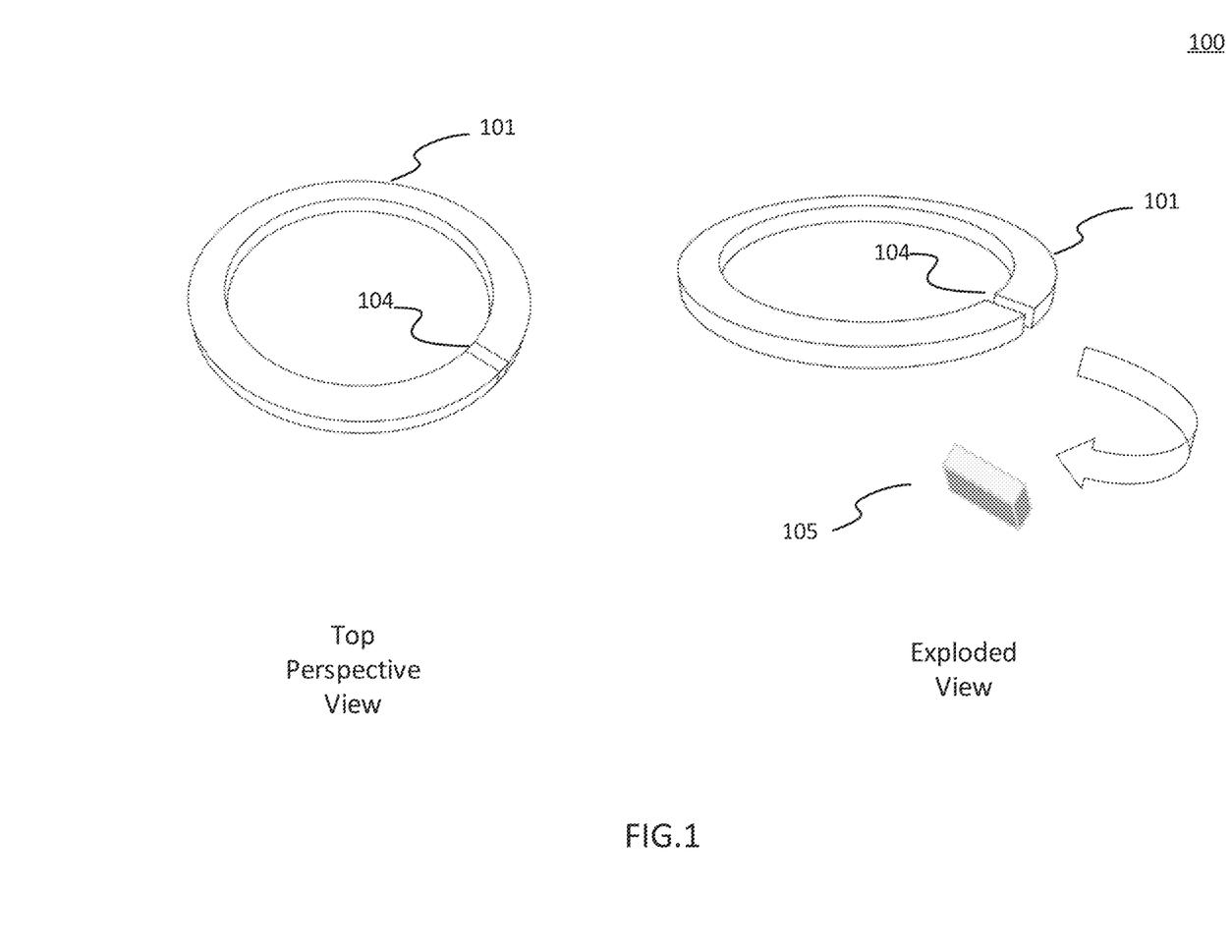
FIG. 1 illustrates a top perspective view and an exploded view of an example antenna for a wearable device, in accordance with various embodiments.

FIG. 1 illustrates a top perspective view and an exploded view of an example antenna 100 including a bezel 101 for a wearable device, in accordance with various embodiments. In the embodiment, bezel 101 may be substantially conductive, e.g., composed primarily of metal or other conductive material. In embodiments, bezel 101 may be included in a wearable device, such as a wrist worn device such as a smart watch (as discussed further below in connection with FIG. 3) in accordance with various embodiments. In embodiments, bezel 101 may include a conductive circuit path to transmit and receive radiofrequency (RF) signals to and from a wearable device. In some embodiments, the conductive circuit path may create a loop. Bezel 101 may itself form the conductive circuit path, being formed of a substantially conductive material, according to various embodiments. In embodiments, the conductive circuit path may follow a path along substantially a ring shape of bezel 101. In various embodiments, bezel 101 may further include a slit or radiofrequency (RF) gap 104 in the conductive circuit path along the substantially ring shape of bezel 101. In embodiments, RF gap 104 may be filled or composed of a non-conductive material. As shown in the exploded view on the right side of FIG. 1, the non-conductive material may include insert or dielectric portion 105. In embodiments, dielectric portion 105 may provide an RF gap 104 in the conductive circuit path while maintaining a smooth "look and feel" to bezel 101. Accordingly, the dielectric insert may be of a color similar to bezel 101 to conceal its presence, in various embodiments. Note that although bezel 101 and thus the conductive circuit path is formed in a ring shape in FIG. 1, in other contemplated embodiments, the conductive circuit path may follow a path along a substantially square, circle, polygon, or other suitable shape of bezel 101.

Figure 2:
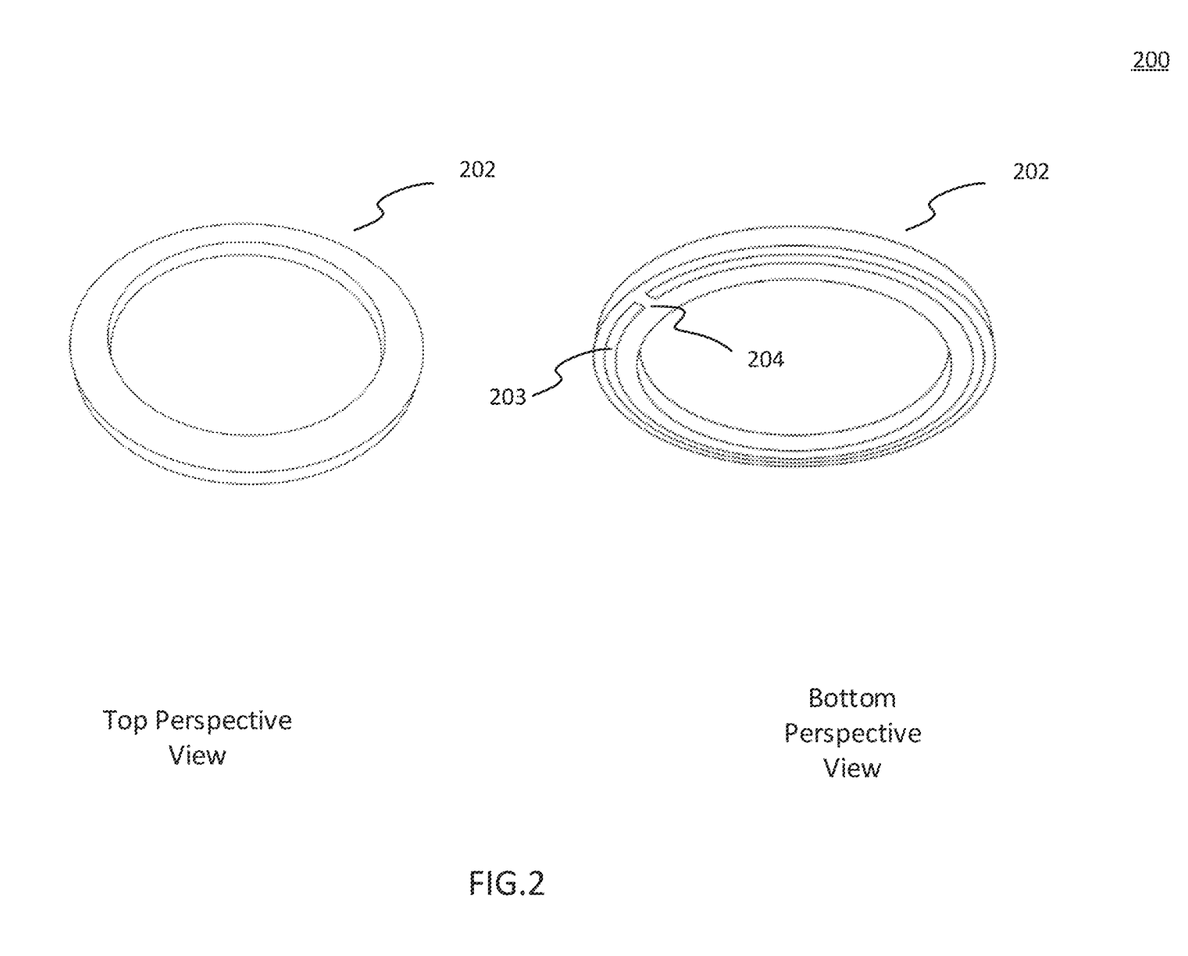
FIG. 2 illustrates a top perspective view and a bottom perspective view of another example antenna for a wearable device, in accordance with various embodiments.

FIG. 2 illustrates an example antenna 200 including a bezel 202 that, in contrast to the bezel 101 of FIG. 1, may be formed of material that is substantially non-conductive, in accordance with various embodiments. As labeled in FIG. 2, a top perspective view and a bottom perspective view of bezel 202 is shown. In embodiments and as shown in the bottom perspective view, bezel 202 may include a conductive antenna pattern 203 printed on a bottom surface of bezel 202. In embodiments, conductive antenna pattern 203 may provide a conductive circuit path to form a conducting loop antenna, e.g., NFC loop antenna, with an RF gap 204. Note that although conductive antenna pattern 203 as shown is printed on the bottom surface of bezel 202, the conductive antenna pattern 203 may be at any suitable location on bezel 202 to provide the conductive circuit path. In various embodiments, the conductive antenna pattern 203 may include one turn (as shown) or in other embodiments may include multiple turns. Accordingly, in the embodiment, bezel 202 may serve multiple roles such as a cosmetic/structural role as a bezel and a functional role as antenna.

Figure 3:
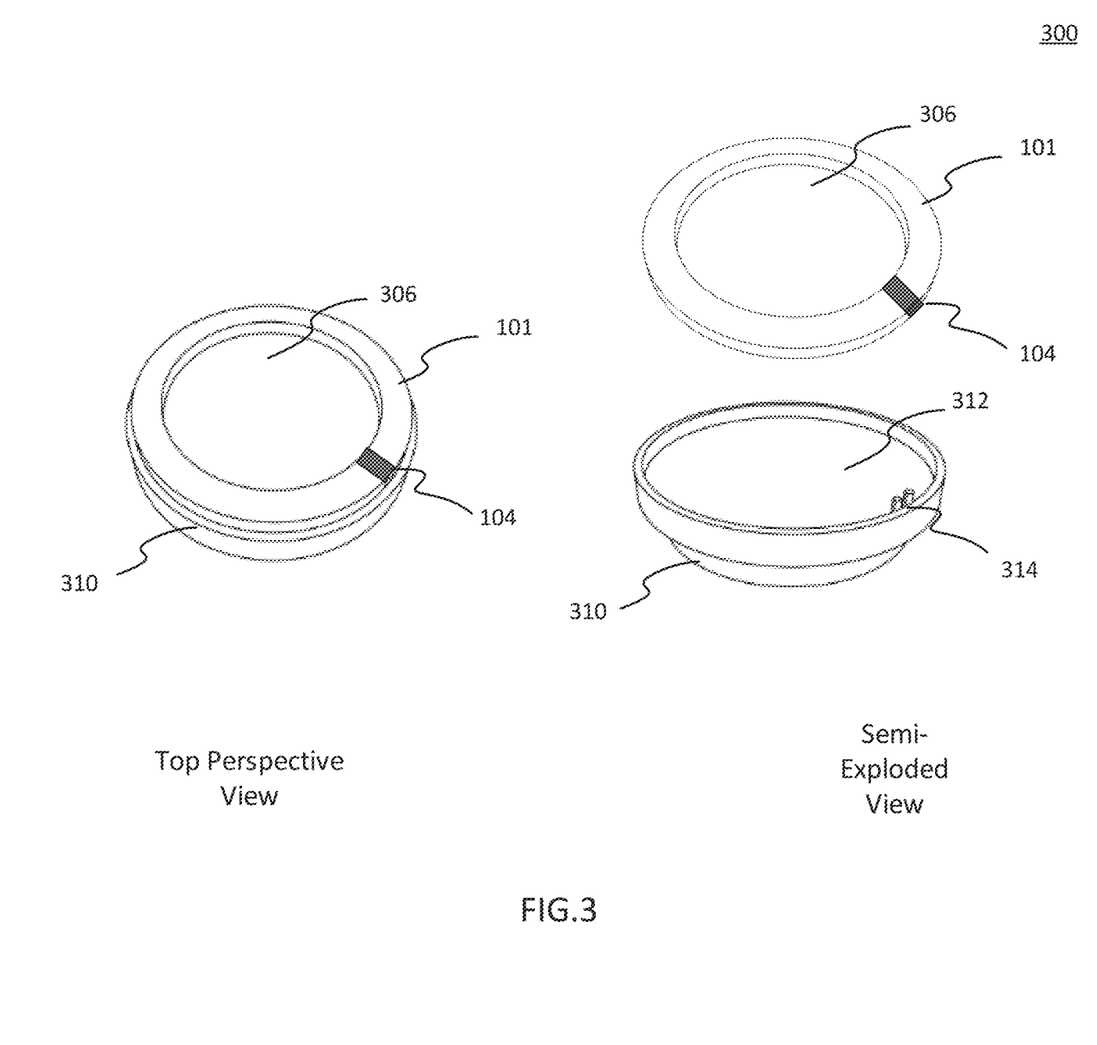
FIG. 3 illustrates a top perspective view and a semi-exploded view of an example wearable device including the antenna of FIG. 1 in accordance with various embodiments.

FIG. 3 illustrates a top perspective view and a semi-exploded view of an example wearable device, i.e., smartwatch 300, including example bezel 101 of FIG. 1 in accordance with various embodiments. In embodiments, bezel 101 may secure a covering to a user interface, e.g., display, to a watch body 310. In various embodiments, the covering may include glass, plastic, other suitable material that may function as a cover to the user interface. In other embodiments, bezel 101 may secure both the covering and user interface to the watch body (in yet other embodiments, aside from an antenna function, bezel 101 may serve an ornamental function with respect to the covering and/or user interface). For ease of illustration, in FIG. 3, both the covering and user interface are denoted as element 106. As discussed in connection with FIG. 1, bezel 101 may itself be formed of a substantially conductive material to form a conductive circuit path. In embodiments, bezel 101 may include RF gap 104 in the conductive circuit path. Furthermore, in embodiments, the user interface may be a digital display module, a mechanical watch face, or other suitable module to serve as a user interface. As shown in the semi-exploded view on the right of FIG. 3, bezel 101 may be coupled to a circuit board or printed circuit board (PCB) 312 at RF gap 104 via pins 314. Note that in embodiments, watch body 310 may be insulated from, i.e., not electrically connected to bezel 101, in order to prevent shorting of the conductive circuit path. Accordingly, in some embodiments, there may be a gap between bezel 101 and watch body 310. For example, in embodiments, bezel 101 may be coupled to PCB 312 while resting on a plastic or ceramic housing separated from watch body 310.

Figure 4:
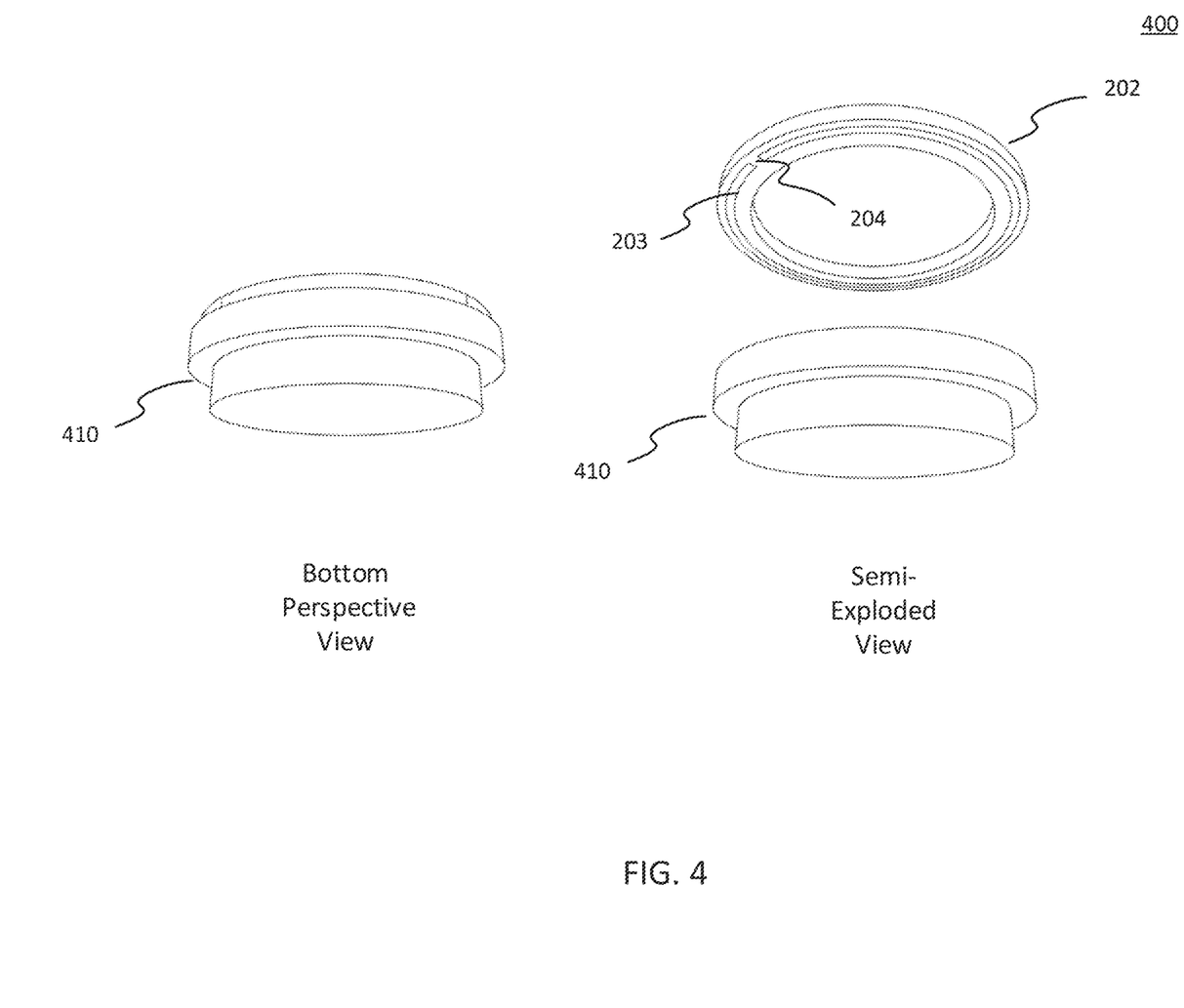
FIG. 4 illustrates a bottom perspective view and a semi-exploded view of an example wearable device including the antenna of FIG. 2 in accordance with various embodiments.

Next, FIG. 4 illustrates a bottom perspective view and a semi-exploded view of an example wearable device, e.g., smartwatch 400, including bezel 202 of FIG. 2, in accordance with various embodiments. In embodiments, smartwatch 400 may include a watch body 410 coupled to bezel 202. Note that in embodiments, watch body 410 may not have a direct connection to bezel 202 in order to avoid a shorting of a conductive antenna pattern 203. Accordingly, in embodiments, watch body 410 may be made of or include a conductive or non-conductive material, i.e., metal and/or plastic. As described in connection with FIG. 2, in the embodiment, bezel 202 may be formed of a substantially non-conductive material, e.g. ceramic or plastic, however, may include conductive antenna pattern 203 printed on a bottom surface of bezel 202. Note that although conductive antenna pattern 203 is shown on a bottom surface of bezel 202, in other embodiments, the conductive antenna pattern may be located on any suitable surface or location on or in bezel 202 to provide a conductive circuit path. In embodiments, conductive antenna pattern 203 may form a conductive circuit path including an RF gap 204 to form an open conductive antenna pattern. In embodiments, bezel 202 may be coupled to, or secure, a covering such as glass or plastic to a user interface of smartwatch 400 (not shown from illustrated perspective).

Figure 5:
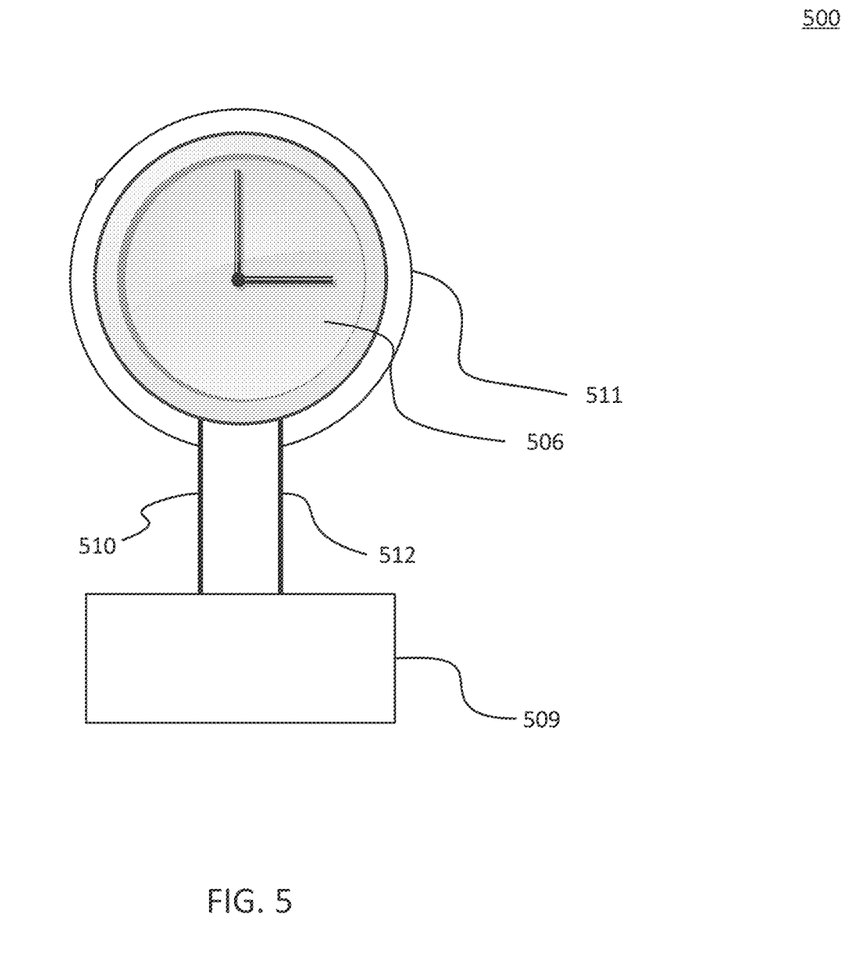
FIG. 5 illustrates a portion of an example wearable device associated with the embodiments of FIGS. 1-4 in accordance with various embodiments.

FIG. 5 illustrates a portion of an example wearable device that may include a bezel similar to bezel 101 or 202 that may include a conductive circuit path coupled to a printed circuit board (PCB) 509, according to various embodiments. In embodiments, a smartwatch 500 may include a bezel 511 and a user interface 506. In the embodiment shown, user interface 506 may include a watch face which may include a mechanical watch face or in other embodiments may include another suitable display module, such as, e.g., a digital display module. As noted above, in embodiments, bezel 511 may be similar to bezel 101 or bezel 202 as discussed in connection with FIGS. 1-4. As shown for the embodiment, a conductive circuit path of bezel 511 may be coupled to a first galvanic connection 510 and a second galvanic connection 511. In embodiments, the conductive circuit path of bezel 511 may receive an RF signal and provide the signal to PCB 509 via galvanic connections 510 and 512. In embodiments, the conductive circuit path of bezel 511 may transmit and receive a differential signal.

Figure 6:
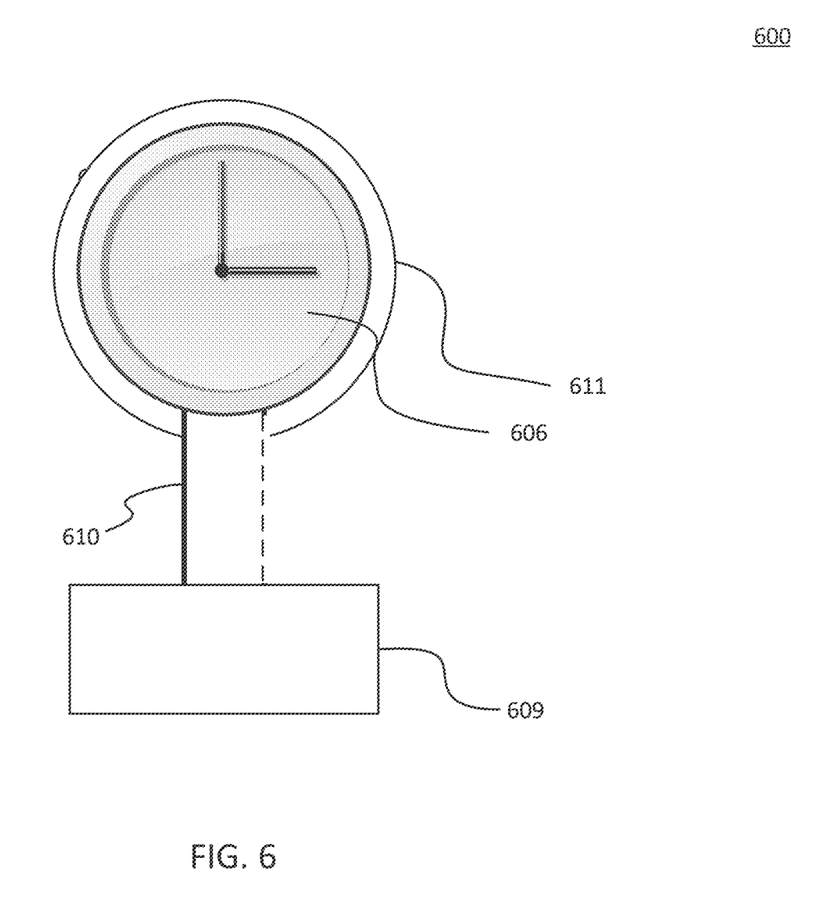
FIG. 6 illustrates a portion of another example wearable device associated with the embodiments of FIGS. 1-4 in accordance with various embodiments.

FIG. 6 illustrates an embodiment of a wearable device such as a smart watch 600 that may include a bezel 611 that may include a conductive circuit path coupled to a printed circuit board (PCB) 609 with a single galvanic connection 610. Similar to the portion of the wearable device of FIG. 5, in embodiments, bezel 611 may include a bezel similar to bezel 101 or bezel 202 of respective FIGS. 1 and 2. Accordingly, bezel 611 may be substantially formed of a conductive material to form the conductive circuit path or may be formed of a substantially non-conductive material and may include a conductive antenna pattern to form the conductive circuit path. In embodiments, the conductive circuit path of bezel 611 may be coupled at a first end to a galvanic connection 610 and at a second end to ground (see dashed line) to form a single ended antenna. Note that, in embodiments, galvanic connection 610 may be coupled to bezel 611 at an RF gap similar to RF gap 104 or RF gap 204 in the conductive circuit paths of respective FIGS. 3 and 4. In embodiments, user interface 606 may include a mechanical watch face as illustrated, a digital display module, or other suitable user interface for wearable device 600.

Figure 7:
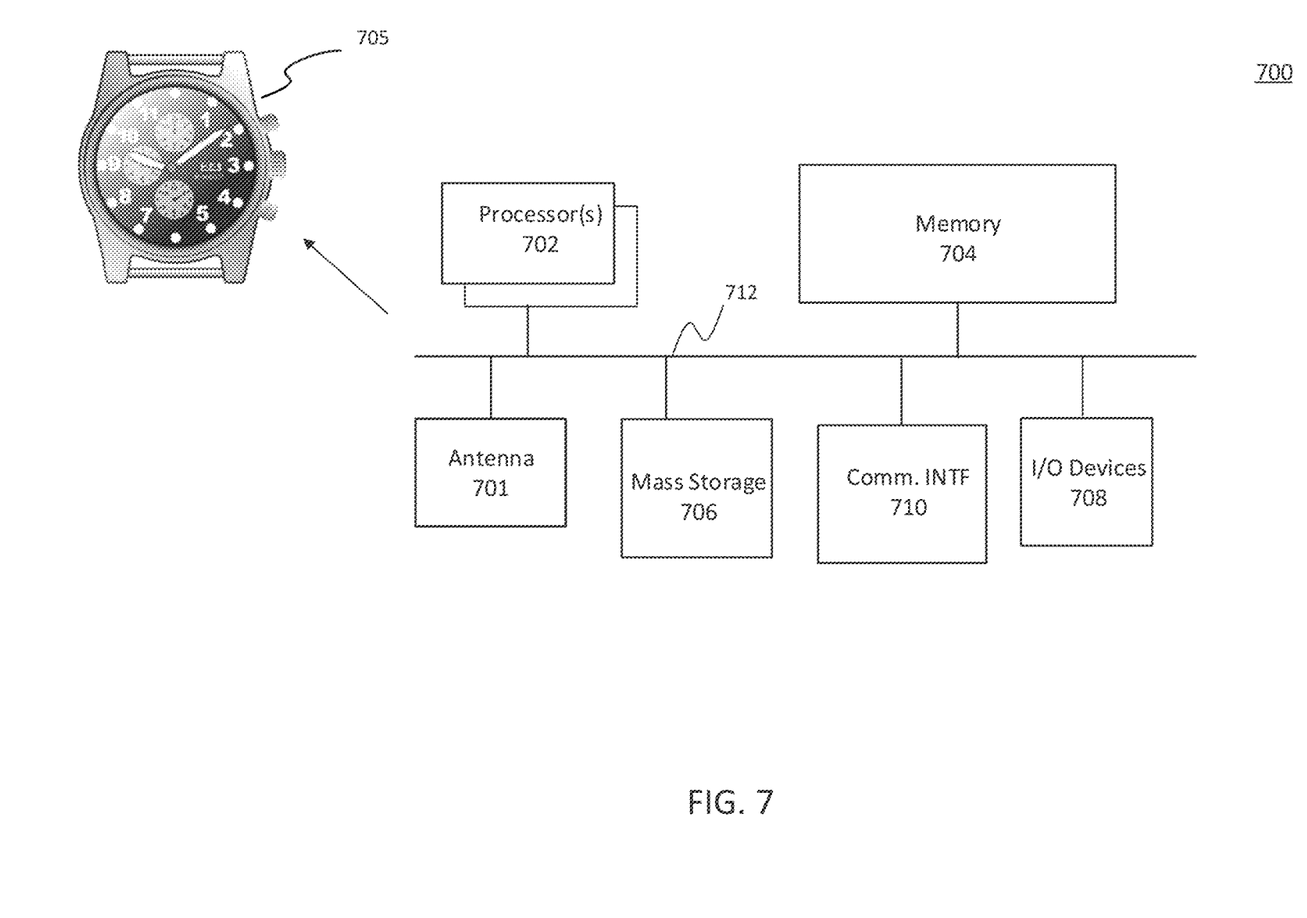
FIG. 7 illustrates an example computer system suitable for use to practice various aspects of the present disclosure, according to the various disclosed embodiments.

FIG. 7 illustrates an example computer system that may be suitable for use to practice selected aspects of the present disclosure. As shown, computer 700 may include one or more processors 702, with each processor having one or more processor cores, and a system memory 704. In embodiments, computer 700 may include or be coupled to antenna 701 which may be similar to bezel 101 or 202 as discussed in connection with FIGS. 1-6. Accordingly, in some embodiments, computer 700 may be included in a wearable device such, e.g., smart watch 705. In embodiments, system memory 704 may include a plurality of instructions, in response to execution by processor cores 702, to provide a plurality of user functions that includes a watch function Additionally, computer 700 may include mass storage devices 706 (such as flash memory or solid state drives), input/output devices 708 (such as display, keyboard, cursor control, remote control, gaming controller, image capture device, and so forth), and communication interfaces 710 (such as network interface cards, modems, infrared receivers, radio receivers (e.g., Bluetooth), and so forth). The elements may be coupled to each other via system bus 712, which may represent one or more buses. In the case of multiple buses, they may be bridged by one or more bus bridges (not shown).

Note that in embodiments, communication interfaces 710 may include a one or more communications chips and may enable wired and/or wireless communications for the transfer of data to and from the computing device 700. In embodiments, communication interfaces 710 may include a transceiver including a transmitter and receiver or a communications chip including the transceiver. In embodiments, antenna 701 may be coupled to a first galvanic connection and/or a second galvanic connection to receive an RF signal and to provide the RF signal to a transceiver or receiver of communication interface 710. Antenna 701 may further be coupled to the first galvanic connection and/or a second galvanic connection to transmit an RF signal provided by communication interface 710. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication interfaces 710 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The communication interfaces 710 may include a plurality of communication chips. For instance, a first communication chip may be dedicated to shorter range wireless communications such as Wi-Fi and Bluetooth, and a second communication chip may be dedicated to longer range wireless communications such as GPS, EDGE, GPRS, CDMA, WiMAX, LTE, Ev-DO, and others.

The elements may be coupled to each other via system bus 712, which may represent one or more buses. In the case of multiple buses, they may be bridged by one or more bus bridges (not shown). Each of these elements may perform its conventional functions known in the art. The number, capability and/or capacity of these elements 702-710 may vary, depending on the applications to be supported by computer 700. Otherwise, the constitutions of elements 702-710 are known, and accordingly will not be further described.

Some non-limiting Examples are provided below.

Example 1 is an apparatus for a wearable device, comprising an antenna for the wearable device including a bezel on the wearable device to include a conductive circuit path to transmit and receive radiofrequency (RF) signals to and from the wearable device.

Example 2 is the apparatus of Example 1, further comprising a display module coupled below the bezel and wherein the bezel is coupled to secure a glass covering over the display module.

Example 3 is the apparatus of claim 1, wherein the bezel is formed of a substantially conductive material to form the conductive circuit path.

Example 4 is the apparatus of Example 1, wherein the conductive circuit path follows a path along a substantially square or a ring shape of the bezel and wherein the bezel further includes a gap in a conductive circuit path along the substantially square or ring shape of the bezel.

Example 5 is the apparatus of Example 4, wherein the gap includes a concealed non-conductive material in the bezel.

Example 6 is the apparatus of Example 1, wherein the bezel is formed of a substantially non-conductive material and the bezel includes a conductive antenna pattern printed on a bottom surface of the bezel to form the conductive circuit path.

Example 7 is the apparatus of Example 1, wherein the conductive circuit path is coupled at a first end to a first galvanic connection and at a second end to a second galvanic connection.

Example 8 is the apparatus of Example 7, further comprising a printed circuit board (PCB) coupled to the first and second galvanic connections.

Example 9 is the apparatus of Example 1, wherein the conductive circuit path is coupled at a first end to a first galvanic connection and at a second end to ground.

Example 10 is the apparatus of any one of Examples 1-9 wherein the wearable device is a wrist worn device.

Example 11 is the apparatus of Example 10, wherein the wrist worn device is a smartwatch.

Example 12 is a method, comprising receiving a first radiofrequency (RF) signal via an antenna pattern embedded in a bezel of a wearable device; and transmitting a second RF signal via the antenna pattern embedded in the bezel of the wearable device.

Example 13 is the method of Example 12, wherein receiving and transmitting the respective first and second RF signals includes receiving and transmitting the RF signals via a bezel formed from substantially conductive material to form an open conductive antenna pattern.

Example 14 is the method of Example 12, wherein receiving and transmitting the respective first and second RF signals includes receiving and transmitting the RF signals via an antenna pattern printed on a bottom surface of a substantially non-conductive bezel.

Example 15 is the method of Example 12, wherein receiving and transmitting the respective first and second RF signals includes receiving and transmitting the RF signals via a bezel that is located over a display of the smartwatch.

Example 16 is the method of any one of Examples 12-15, wherein transmitting the second RF signal includes transmitting a differential RF signal via a conductive circuit path coupled at a first end to a first galvanic connection and at a second end to a second galvanic connection.

Example 17 is a smartwatch system, comprising a bezel; a user interface; and a circuit board coupled to the bezel and the user interface and including a processor; a memory coupled to the processor, including a plurality of instructions, in response to execution by the processor, to provide a plurality of user functions that includes a watch function; and a transceiver; wherein the bezel is coupled to the transceiver and includes an antenna having a conductive circuit path to receive and transmit RF signals.

Example 18 is the smartwatch system of Example 17, wherein the bezel to secure a covering of the user interface to a smartwatch.

Example 19 is the smartwatch system of Example 17, wherein the user interface is at least one of a display module or mechanical watch face.

Example 20 is the smartwatch system of any one of Examples 17-19, wherein the conductive circuit path includes first and second galvanic connections to the circuit board to transmit a differential signal.

Example 21 is the smartwatch system of any one of Examples 17-20, wherein the conductive circuit path includes a first galvanic connection to the circuit board and a second galvanic connection to ground.

Example 22 is a wearable device, comprising: antenna means for providing a conductive circuit path to transmit and receive radiofrequency (RF) signals to and from the wearable device; and a display module coupled below the antenna means.

Example 23 is the wearable device of Example 22, wherein the antenna means is coupled to a covering over the display module.

Example 24 is the wearable device of Example 22, further comprising connection means for receiving a signal from the conductive circuit path and providing the signal to a transceiver.

Example 25 is the wearable device of Example 22, further comprising first and second connection means for providing a signal to the conductive circuit path for transmission of a differential signal.

Although certain embodiments have been illustrated and described herein for purposes of description this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An apparatus for a wearable device, comprising:
   an antenna for the wearable device including:
      a bezel on the wearable device to include a conductive circuit path to transmit and receive radiofrequency (RF) signals to and from the wearable device, wherein the bezel is formed of a substantially non-conductive material and the bezel includes a conductive antenna pattern printed on a bottom surface of the bezel to form the conductive circuit path, and wherein the conductive circuit path is coupled at a first end to a first galvanic connection and at a second end to a second galvanic connection and follows a shape of the bezel to transmit and receive differential signals along the conductive circuit path and further wherein the conductive circuit path includes a gap that is non-conductive and the gap is integrated into the bezel to conceal the gap.

2. The apparatus of claim 1, further comprising a display module coupled below the bezel and wherein the bezel is coupled to secure a glass covering over the display module.

3. The apparatus of claim 1, wherein the conductive circuit path follows a path along a substantially square or a ring shape of the bezel.

4. The apparatus of claim 1, further comprising a circuit board coupled to the first and second galvanic connections.

5. The apparatus of claim 1, wherein the wearable device is wrist worn device.

6. The apparatus of claim 5, wherein the wrist worn device is a smartwatch.

7. A method, comprising:
   receiving radiofrequency (RF) signals via an antenna pattern embedded in a bezel of a wearable device; and
   transmitting RF signals via the antenna pattern embedded in the bezel of the wearable device, wherein receiving and transmitting the respective RF signals includes receiving and transmitting the RF signals via an antenna pattern printed on a bottom surface of a substantially non-conductive bezel, and wherein receiving and transmitting RF signals includes receiving and transmitting differential RF signals via a conductive circuit path formed by the antenna pattern and coupled at a first end to a first galvanic connection and at a second end to a second galvanic connection and follows a shape of the bezel to transmit and receive the differential RF signals along the conductive circuit path and further wherein the conductive circuit path includes a gap that is non-conductive and the gap is integrated into the bezel to conceal the gap.

8. The method of claim 7, wherein the bezel is located over a display of a smartwatch.

9. A smartwatch system, comprising:
   a bezel;
   a user interface; and
   a circuit board coupled to the bezel and the user interface and including:
      a processor;
      a memory coupled to the processor, including a plurality of instructions, in response to execution by the processor, to provide a plurality of user functions that includes a watch function; and a transceiver;
wherein the bezel is coupled to the transceiver and includes an antenna having a conductive circuit path to receive and transmit RF signals, wherein the bezel is formed of a substantially non-conductive material and the bezel includes a conductive antenna pattern printed on a bottom surface of the bezel to form the conductive circuit path coupled at a first end to a first galvanic connection and at a second end to a second galvanic connection to transmit differential signals, wherein the conductive circuit path follows a shape of the bezel to transmit and receive the differential signals along the conductive circuit path and further wherein the conductive circuit path includes a gap that is non-conductive and the gap is integrated into the bezel to conceal the gap.

10. The smartwatch system of claim 9, wherein the bezel is to secure a covering of the user interface to a smartwatch.

11. The smartwatch system of claim 9, wherein the user interface is at least one of a display module or mechanical watch face.

12. The smartwatch system of claim 9, wherein the first and second galvanic connections are coupled to the circuit board to assist in receiving and transmitting the differential signals.

\* \* \* \* \*